Figure 1:
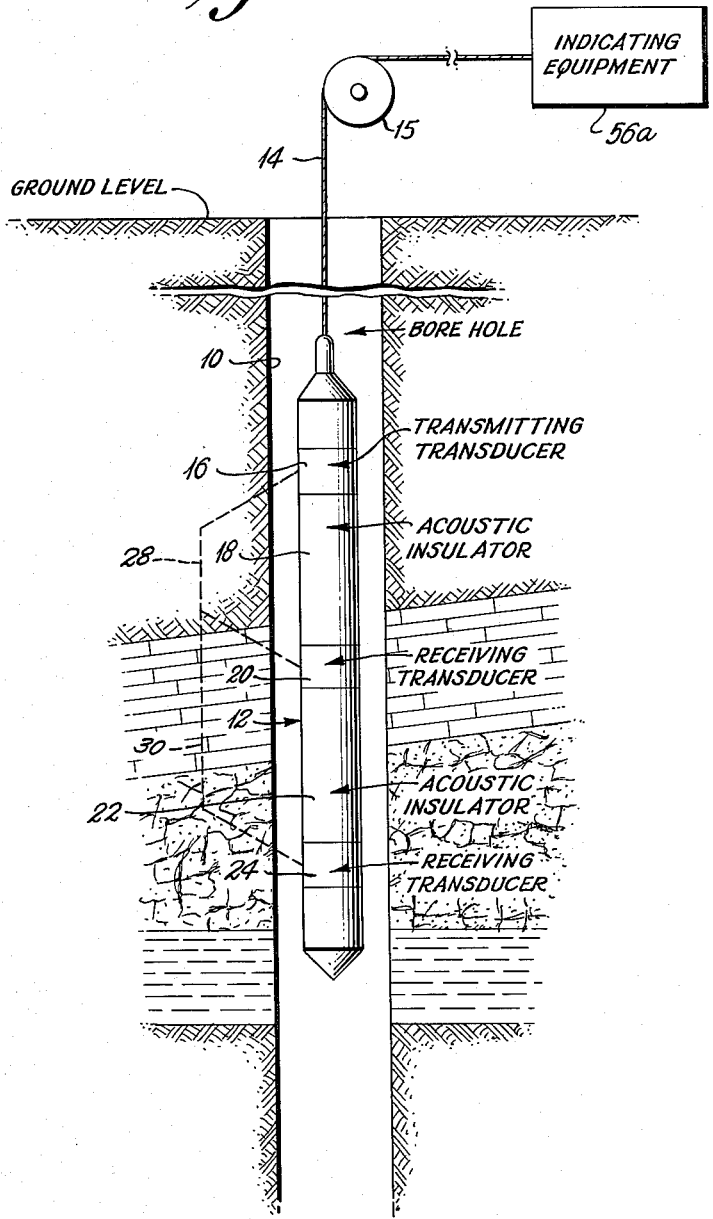

INVENTORS
Allen Wendell Engle and
John Lyle Casey
BY Robert K. Schumacher
ATTORNEY

United States Patent Office 2,994,398
Patented Aug. 1, 1961

2,994,398
ACOUSTIC INSULATOR FOR ACOUSTIC WELL LOGGING TOOLS
Allen Wendell Engle and John Lyle Casey, Tulsa, Okla., assignors, by mesne assignments, to Dresser Industries, Inc., Dallas, Tex., a corporation of Delaware
Filed Feb. 6, 1959, Ser. No. 791,631
1 Claim. (Cl. 181—.5)

The present invention relates to an improved acoustic insulator for acoustic well logging tools, and has particular reference to an improved acoustic insulator for suspending one transducer element below another transducer element in assembled relationship in the well logging tool for preventing acoustic as well as electrical coupling between the transducers.

In the prior art of acoustic well logging tools, there have been used connectors such as a wire cable for providing a supporting connection between transducer elements of an acoustic well logging tool. To provide for attenuation of acoustic energy propagating along the wire cable, several metal weights are attached to the wire cable to form an attenuated acoustic line so that a large portion of the acoustic energy passing along the wire cable is filtered out or attenuated.

Another of the prior art devices provides for the use of a multi-linked chain encapsulated in neoprene. There is no practical way of passing electrical conductors through the neoprene, hence, they are made to pass spirally around the outer surface of the neoprene sleeve. The inherent disadvantage of this arrangement is that the wires are susceptible to breaking and damage, as the wires in their external position engage with jagged portions of the bore hole while the tool is in a subsurface position. Further the device is very difficult to manufacture.

Accordingly, the present invention is directed to an acoustic insulator comprising a chain with insulation elements in position between some links of the chain. The chain is disposed in a hollow neoprene tube filled with a dielectric fluid and with the necessary electrical connections passing by cables through the fluid. The insulation elements usually comprise a composition such as rubber, neoprene or other elastomeric material, and are positioned at predetermined intervals along the chain for breaking up the acoustic path. Usually, a liquid such as castor oil or silicone fluid having good temperature and electrical insulating characteristics is used for the filling fluid. The fluid prevents collapse of the rubber tube when it is placed under external pressure usually present in subterranean bore holes.

Therefore, it is an object of the invention to provide a device or arrangement of elements for preventing direct acoustic and electrical coupling between two acoustic transducers by interposing an isolating member. One transducer may be a receiving transducer and the other may be a transmitting transducer.

Also, it is an object of the invention to improve the characteristics of the receiving transducers in acoustic logging tools by eliminating direct coupling between the receiving transducer and the transmitting transducer, since it is known that receiving transducers will not operate satisfactorily when direct coupling exists between the receiving transducers and the transmitting transducer or a coil thereof.

In accordance with a preferred embodiment of the invention, an acoustic insulator for an acoustic well logging tool comprises a neoprene thick-walled cylinder filled with liquid having therein a multi-linked chain interconnecting the end members. At pre-selected parts of the chain, a neoprene bumper is bonded intermediate the connecting lengths to act and provide for breaking up the acoustic path through the chain. These elements are isolating members. The electrical conductors for providing signals to and from the transducers are passed through the neoprene cylinders at a peripheral portion thereof and along the side of the connecting chain.

The advantages to be gained by the present invention are ease of manufacture, good acoustic and electrical insulation between the respective transducers thereof, improved wiring characteristics between the transducers by placing the wiring inside of the rubber tube or the housing for preventing mechanical abrasion thereof by jagged portions of the bore hole that may contact and break the wires.

Figure 2:
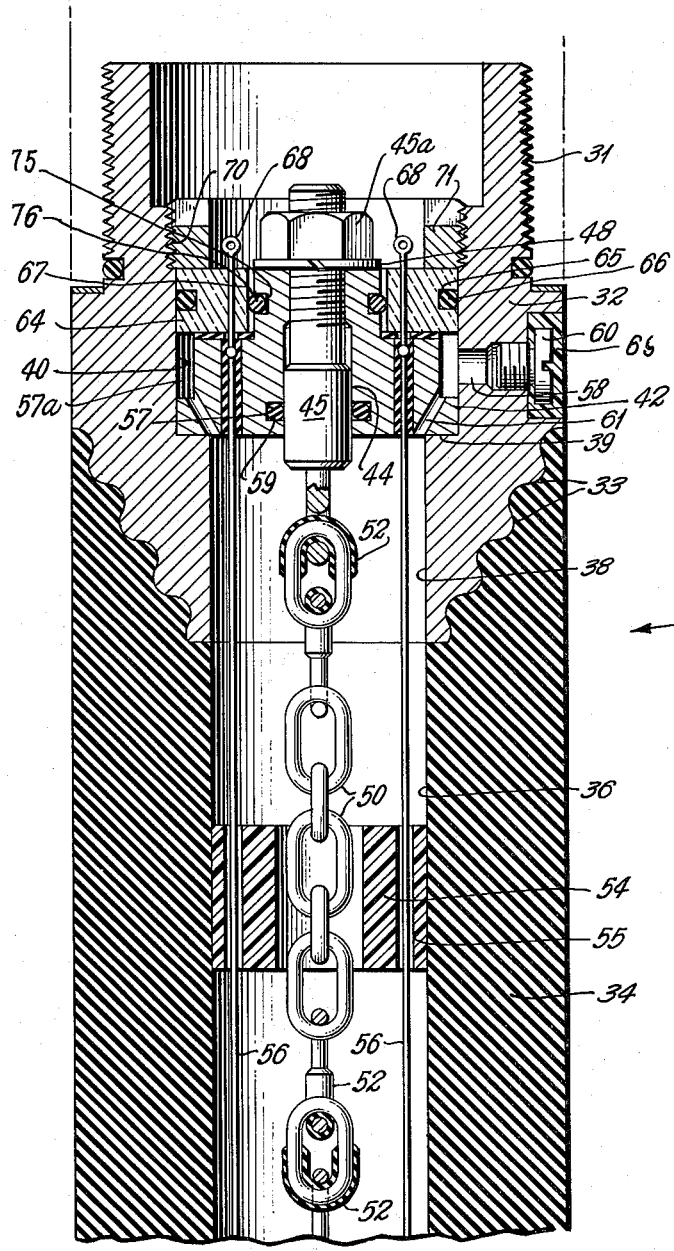

A complete understanding of the invention may be had from the following description of a particular embodiment of the invention. In the description, reference is made to the accompanying drawings of which:

FIGURE 1 is a diagrammatic view of an acoustic well logging instrument in a well bore hole in accordance with the present invention; and FIGURE 2 shows a broken away cross-sectional view of a portion of an acoustic insulator used in an acoustic well logging tool shown in FIGURE 1 in accordance with the preferred embodiment of the present invention.

Referring now to FIGURE 1, there is illustrated in a bore hole 10, having various strata of earth formation therealong, a subsurface instrument or acoustic logging tool 12 suspended by a cable 14 which in turn is suspended from pulley 15 over which the cable 14 is traversed (as by means of a power winch not shown) to raise or lower the subsurface instrument 12, thereby traversing the bore hole 10. The pulley 15 may be supported in a conventional manner, not shown, as by a block suspended from a derrick erected over the bore hole. Along the length of the acoustic well logging tool there is first a transmitting transducer 16, as acoustic insulator 18, a receiving transducer 20, another acoustic insulator 22, and a receiving transducer 24.

As the transmitting transducer is energized by an electrical pulse from a transmitting generator (not shown), acoustic energy emanates from the transmitting transducer in a principally radial direction. That energy received by the receiving transducer 20 from the transmitting transducer is seen to pass along a path 28 and the energy received by receiving transducer 24 is seen to pass along a path 30 to the receiving transducer 24.

At each end of the acoustic insulator 18 there is a coupling member 32 having one end thereof provided with a threaded portion 31, shown in FIG. 2, for engaging a corresponding threaded portion of transducer 16, 20, or 24. The other end portion of the coupling member 32 is generally a conic configuration having a series of annular ridges 33 along the conic configuration and coaxial with the axis thereof. An elastomeric material such as neoprene is molded onto the thick-walled annular ridges of the coupling member 32 for forming a tubular sleeve 34. The annular ridges of the conic configuration are found to lend strength in holding the neoprene sleeve thereto, but are principally useful in providing increased surface contact between the conic configuration and the tubular sleeve. The neoprene sleeve includes an opening 36 therethrough extending along its axis. The opening 36 in the tubular sleeve 34 is coextensive with an opening 38 in the coupling member 32.

The coupling member 32 has an internal shoulder 39 between the opening 38 and a slightly larger opening 40 extending through an intermediate portion of the coupling 32. A flanged member 42, having an opening 44 therethrough coaxial with the opening 40, is positioned to rest against the internal shoulder 39. The peripheral portions of the flanged member engage the shoulder 39. Through the opening 44 in the flanged member, a bolt having a linking member such as an eyebolt 45 is passed to threadedly engage a nut 45a at one end of the eyebolt.

A split lock-washer 48 is interposed between the nut and the flanged member, and is coaxial with the eyebolt. Through the other end of the eyebolt 45 there is coupled one end of a multi-linked chain 50, the other end of which is similarly coupled to a threaded eyebolt (not shown) at the other end of the acoustic insulator 18. The eyebolt 45 serves as a terminal link for the multi-linked chain. The multi-linked chain 50 is of sufficient strength so that it will not break when the chain is under tension in operation in the bore hole. At predetermined distances along the multi-linked chain 50, neoprene insulators 52 are placed between adjacent links of the chain to provide an interrupted coupling path for acoustic and electrical energy.

Spaced along the length of the multi-linked chain are spacer members 54 placed coaxially with the chain. Conductors 56 are passed along and within the opening 36 in the neoprene tubular sleeve 34 and through openings 55 in peripheral portions of the spacer member to the ends of the acoustic insulator. The electrical conductors 56 provide for supplying power for operation of electronic equipment, and for passing signals from one or both of the receiving transducers 20, 24 in the well logging tool to the cable 14 by which they are passed to indicating equipment 56a.

Within a recess 57 in the opening 44 of the flanged mtmber 42 there is an O-ring 59 to provide for centering the position of the eyebolt 45. An annular recess 57a formed by the exterior of the flanged member 42 engages a fluid-filling hole 58 which is closed off by a plug 60. The fluid-filling hole and plug therefor may be at each end of the acoustic insulators 18, 22. The fluid then may fill each acoustic insulator from one end and air may be exhausted from the other end. The fluid used in filling the sleeve of the acoustic insulator is liquid having low acoustic velocity characteristics remaining substantially constant with changes in temperature and may generally be castor oil, DC–200, or any other similar dielectric fluid having good temperature characteristics at subsurface conditions as well as good electrical insulating characteristics. DC–200 is a chemical trade name of the Dow-Corning Company for various polymethyl siloxanes used as liquid dielectrics, hydraulic fluids, lubricants and lubricant additives, mold release agents, water repellants, anti-foaming compounds, and the like.

The fluid fills the opening 38 through the passage 61 in the flanged member 42 and the recess 57a. A neoprene cap 69 may be used to cover the plug 60.

A hermetic seal header 64 has an annular recess 65 around a peripheral portion thereof for receiving an O-ring 66 to seal header 64 to coupling member 32. An opening 67 passes through the center of the hermetic seal header 64. Flanged member 42 passes through this opening and has an annular recess 75 for receiving an O-ring 76 to seal header 64 to member 42. Electrical insulation material forms the hermetic seal header 64 so that conductor wires 56 passing through are not electrically shorted out. On the exterior side of the hermetic seal header 64, the conductor wires 56 terminate in pins 68. The pins extending through the hermetic seal header 64 are adapted to engage a slip ring coupling (not shown) that may be formed in the ends of the transmitting transducer or receiving transducers. The threaded portion 31 of the coupling member 32 is provided for engaging the ends of the transmitting transducer or a receiving transducer. Threads 70 engage a lock-ring 71 to hold the flanged member 42 and seal header 64 in place.

It should be understood that the specific apparatus herein illustrated and described is intended to be representative only, as many changes may be made therein without departing from the clear teachings of the invention. Accordingly, reference should be made to the following claim in determining the full scope of the invention.

What is claimed is:

An acoustic well logging apparatus comprising an acoustic energy generating element for producing acoustic waves for transmission into a bore hole; an acoustic energy receiving element for receiving said waves passing along the bore hole; means connected therebetween for spacing apart the acoustic energy generating element from the acoustic energy receiving element, said spacing means including a hollow sleeve of acoustic insulating material, a dielectric liquid with a low acoustic velocity characteristic confined in said sleeve, and a multi-linked chain passing freely through said liquid in said sleeve for suspending one of said elements from the other, said spacing means further including at least one acoustic insulator positioned to acoustically insulate at least one link of said multi-linked chain from an adjacent link; and electrical conductor means also disposed in said sleeve to provide an electrical circuit from one of said elements through said spacing means.

References Cited in the file of this patent
UNITED STATES PATENTS

| | | |
|---|---|---|
| 2,233,992 | Wyckoff | Mar. 4, 1941 |
| 2,708,485 | Vogel | May 17, 1955 |
| 2,742,629 | Summers et al. | Apr. 17, 1956 |
| 2,897,478 | Summers et al. | July 28, 1959 |